(12) United States Patent
Dongre

(10) Patent No.: US 7,975,047 B2
(45) Date of Patent: Jul. 5, 2011

(54) RELIABLE PROCESSING OF HTTP REQUESTS

(75) Inventor: M. Keerthidhara Dongre, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 136 days.

(21) Appl. No.: 12/339,110

(22) Filed: Dec. 19, 2008

(65) Prior Publication Data

US 2010/0161714 A1    Jun. 24, 2010

(51) Int. Cl.
  *G06F 15/173* (2006.01)
  *G06F 9/46* (2006.01)
(52) U.S. Cl. ......... 709/224; 709/223; 709/225; 718/105
(58) Field of Classification Search ................ 709/220, 709/223–225, 227; 718/105
  See application file for complete search history.

(56) References Cited

U.S. PATENT DOCUMENTS

| | | | |
|---|---|---|---|
| 6,003,082 A | 12/1999 | Gampper et al. | |
| 6,052,730 A | 4/2000 | Felciano et al. | |
| 6,279,001 B1 | 8/2001 | DeBettencourt et al. | |
| 6,304,967 B1* | 10/2001 | Braddy | 713/150 |
| 7,093,073 B2 | 8/2006 | Truty | |
| 7,231,661 B1 | 6/2007 | Villavicencio et al. | |
| 7,606,808 B2* | 10/2009 | McCann et al. | 1/1 |
| 2002/0112061 A1 | 8/2002 | Shih et al. | |
| 2003/0110154 A1* | 6/2003 | Ishihara et al. | 707/1 |
| 2004/0044760 A1 | 3/2004 | Deily et al. | |
| 2005/0050552 A1 | 3/2005 | Fuller | |
| 2005/0114480 A1* | 5/2005 | Ramamoorthy | 709/220 |
| 2005/0261985 A1* | 11/2005 | Miller et al. | 705/26 |
| 2006/0080419 A1* | 4/2006 | Patrick et al. | 709/220 |
| 2006/0185021 A1* | 8/2006 | Dujari et al. | 726/27 |
| 2008/0126831 A1 | 5/2008 | Downey et al. | |
| 2009/0249131 A1* | 10/2009 | Mitomo | 714/48 |

OTHER PUBLICATIONS

"Stephen Todd et al.,", "A Primer for HTTPR", http://www.ibm.com/developerworks/webservices/library/ws_phtt/, Dated: Mar. 8, 2005, pp. 1-8.

"Caching Guide", "http://httpd.apache.org/docs/2.2/caching.html", Copyright Date: 2008, pp. 1-7.

"HTTPCACHE", "http://bitworking.org/projects/httpcacher/", Copyright Date: 2002-2008, pp. 1-2.

"HTTP Protocol Stack (IIS 6.0)", "http://www.microsoft.com/technet/prodtechnol/WindowsServer2003/Library/IIS/a2a45c42-38bc-464c-a097-d7a202092a54.mspx?mfr=true", Downloaded Circa: Oct. 16, 2008, pp. 1-2.

(Continued)

*Primary Examiner* — Joseph E Avellino
*Assistant Examiner* — Aftab Nasir Khan
(74) *Attorney, Agent, or Firm* — Narendra Reddy Thappeta

(57) ABSTRACT

A monitoring tool provided according to an aspect of the present invention causes an HTTP request to be resubmitted to another server system if a server system, to which the same HTTP request has been earlier submitted, is detected to have failed without completing processing of the request. In one embodiment, the server system is deemed to have failed upon absence of completion of requests for a pre-specified duration. As an alternative or in addition, the operational status of the server system is checked periodically and the server system is deemed to have failed if it is non-operational.

23 Claims, 6 Drawing Sheets

OTHER PUBLICATIONS

"Load Balancing and Failover", "http://download.oracle.com/docs/cd/B14099_19/wireless.1012/b13820/load.htm#i1005577", Copyright Date: 2000-2005, pp. 1-3.

"Saving Just an HTTP Request, or Just an HTTP Response", "http://www.softx.org/ttp_debugger_manual/saving_request_response.html", Copyright Date:2005-2007, p. 1.

"Server-Side Request Caching", "http://publib.boulder.ibm.com/tividd/td/ITAME/SC32-1359-00/en_US/HTML/am51_webseal_guide67.htm#cfg-svr-cache", Downloaded Circa: Oct. 16, 2008, pp. 1-4.

"Transparent Distributed Web Caching With Minimum Expected Response Time", http://ieeexplore.ieee.org/search/srchabstract.jsp?arnumber=1203721&isnumber=27061&punumber=8553&k2dockey=1203721@ieeecnfs&query=%28%28http.

* cited by examiner

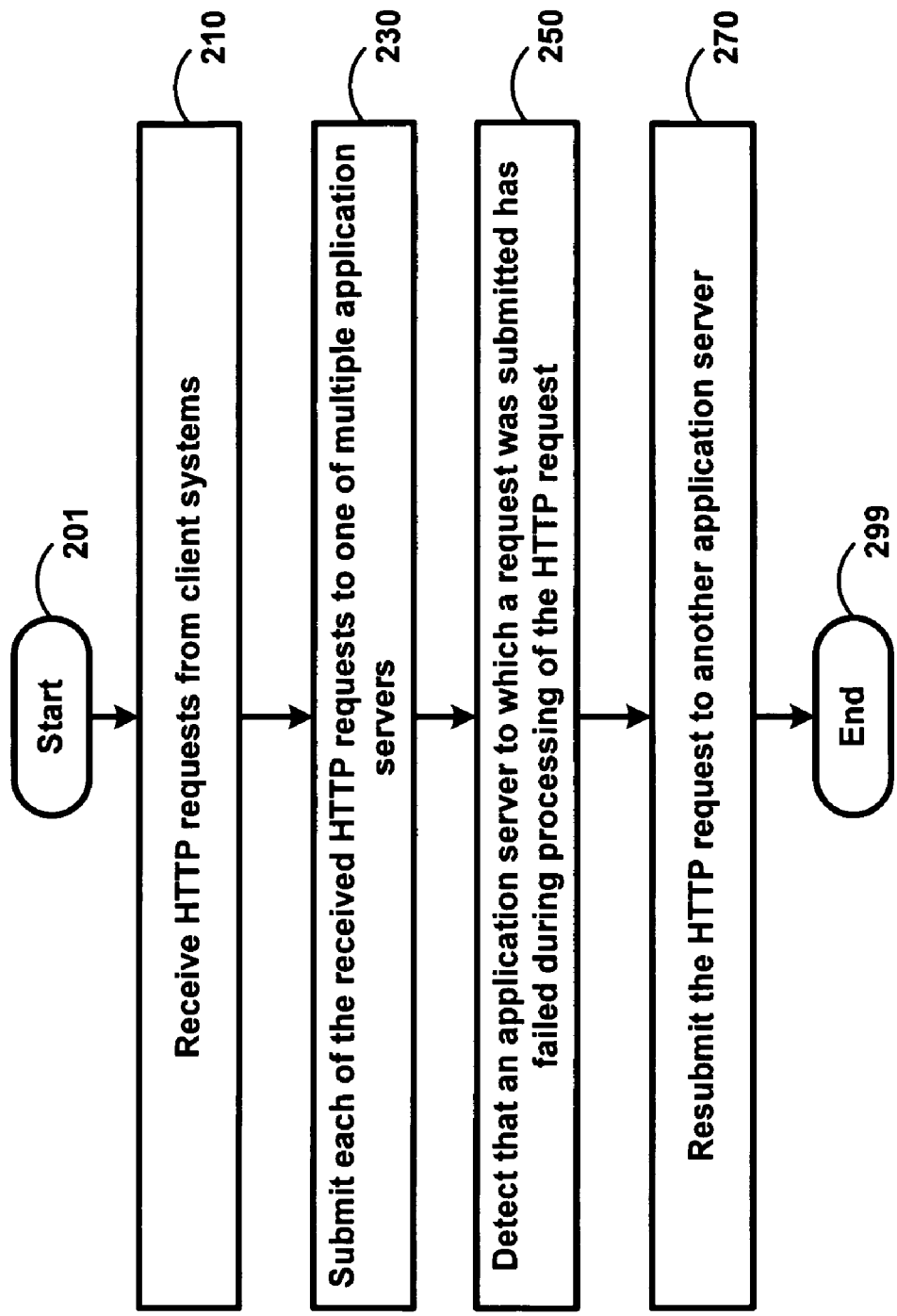

FIG. 4A

| Session ID | Request | Server ID | Processed |
|---|---|---|---|
| 101 | R1 | S1 | No |
| 102 | R2 | S2 | No |
| 103 | R3 | S4 | No |
| 104 | R4 | S3 | No |
| 105 | R5 | S2 | No |

FIG. 4B

| Session ID | Request | Server ID | Processed |
|---|---|---|---|
| 101 | R1 | S1 | Yes |
| 102 | R2 | S3 | No |
| 103 | R3 | S1 | No |
| 104 | R4 | S3 | Yes |
| 105 | R5 | S3 | No |

US 7,975,047 B2

RELIABLE PROCESSING OF HTTP REQUESTS

BACKGROUND

1. Technical Field

The present disclosure relates to network communications and more specifically to reliable processing of hypertext transfer protocol (HTTP) requests.

2. Related Art

HTTP is a commonly used protocol for communication between client and server systems. As is well known, a client system sends HTTP requests (indicating specific tasks sought to be performed) to a server system, and receives corresponding HTTP responses (containing the result of performance of the requested tasks) on successful processing of the HTTP requests by the server system. A version of HTTP is described in further detail in RFC2616—Hypertext Transfer Protocol—HTTP/1.1.

Processing of HTTP requests fails in some scenarios, implying that a server does not send a response to an earlier received request from a client. A response may not be sent, for reasons such as failures occurring in back-end system generating the data forming the basis for the response, etc. Accordingly, a client system is often designed or required to resend the HTTP request again to the server system after waiting for a pre-specified duration.

Reliable processing of HTTP requests ensures that tasks indicated in an HTTP request are performed (and a corresponding HTTP response is sent) without forcing the requesting client system to resend the HTTP request again.

BRIEF DESCRIPTION OF THE DRAWINGS

Example embodiments of the present invention are described with reference to the accompanying drawings briefly described below.

FIG. 2 is a flow chart illustrating the manner in which HTTP requests are processed reliably according to an aspect of the present invention.

FIGS. 4A and 4B are tables illustrating the snap shots of data in a front end server at corresponding time instances in an embodiment of the present invention.

In the drawings, like reference numbers generally indicate identical, functionally similar, and/or structurally similar elements. The drawing in which an element first appears is indicated by the leftmost digit(s) in the corresponding reference number.

DESCRIPTION OF EXAMPLE EMBODIMENTS

1. Overview

A computing system provided according to an aspect of the present invention includes a front end server to submit a HTTP request to a first server system, and then to resubmit the same HTTP request to a second server system upon detecting that the first server system has failed without completing processing of said HTTP request. Due to such resubmission of requests, the client systems may not need to resend the same HTTP requests (as another request) when a response is not received.

In an embodiment, the front end server stores a portion of the HTTP request that is required to be sent to the second server system to process the HTTP request. The HTTP request is resubmitted using the stored portion of the data.

According to another aspect of the present invention, the front end system stores a status information indicating whether processing of (received and submitted) HTTP requests is completed or not. The status information is checked before resubmitting HTTP requests to other server systems.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, with other methods, or combining one more aspects/features described herein, etc. In other instances, well-known structures or operations are not shown in detail to avoid obscuring the features of the invention.

2. Example Environment

Figure 1A:
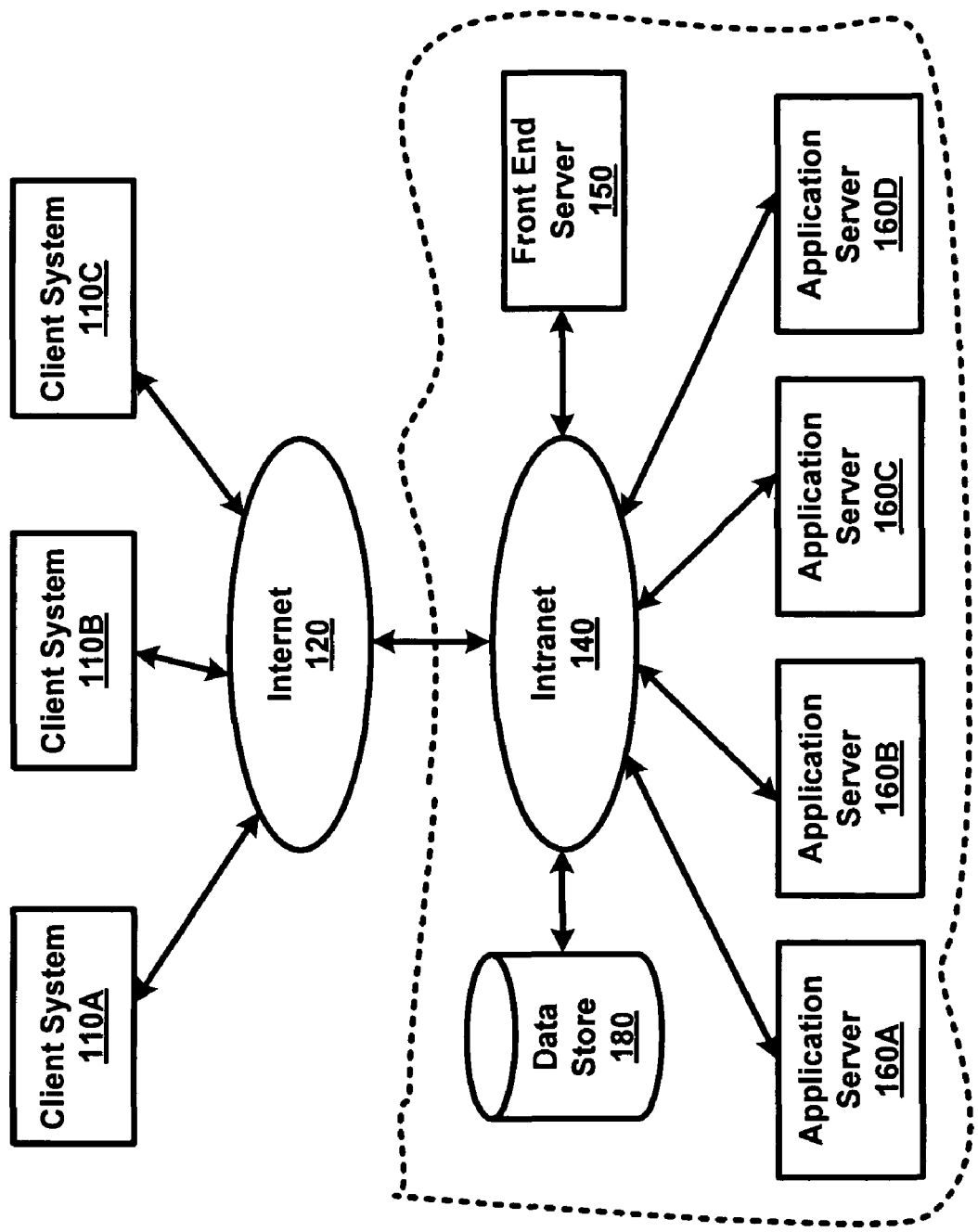
FIG. 1A is a block diagram illustrating the details of an example computing system in which several aspects of the present invention can be implemented.

FIG. 1A is a block diagram illustrating an example environment (computing system) in which several aspects of the present invention can be implemented. The block diagram is shown containing client systems 110A-110C, Internet 120, intranet 140, front end server 150, application servers 160A-160D and data store 180.

Merely for illustration, only representative number/type of systems is shown in the Figure. Many environments often contain many more systems, both in number and type, depending on the purpose for which the environment is designed. Each block of FIG. 1A is described below in further detail.

Intranet 140 represents a network providing connectivity between application servers 160A-160D, data store 180, and front-end server 150, all provided within an enterprise (shown with dotted boundaries). Internet 120 extends the connectivity of these (and other systems of the enterprise) with external systems such as client systems 110A-110C.

Each of intranet 140 and Internet 120 may be implemented using protocols such as Internet Protocol (IP) well known in the relevant arts. In general, in IP environments, an IP packet is used as a basic unit of transport, with the source address being set (in the originating system) to the IP address assigned to the source system from which the packet originates and the destination address set to the IP address of the target system to which the packet is to be eventually delivered.

Data store 180 represents a non-volatile storage facilitating storage and retrieval of a collection of data by one or more (enterprise) applications executing in application servers 160A-160D (typically while processing various client requests) or front end server 150. In one embodiment, data store 180 is implemented using relational database technologies and therefore provides storage and retrieval of data using structured queries such as SQL (Structured Query Language).

Each of client systems 110A-110C represents a system such as a personal computer, workstation, mobile station, etc., that generate (client) HTTP requests to enterprise applications executing in application servers 160A-160D. The HTTP requests may be generated by applications executing in the client system such as a web browser (in response to a user interaction), a user application designed to use a web service, a web service (sending a request to another web service), etc. As is well known, a web service provides a set of operations, which can be invoked from external applications (over a network).

Each HTTP request contains data, usually in the form of a universal resource locator/indicator (URL/URI). As noted in RFC 2616, the URL/URI identifies a host (by a name or IP address), a TCP/UDP port number (default 80), and optional parameters. The application listing at the port number processes the parameters. The resource specified by the URL is deemed to be at the server/application listening on the port. Processing the URL may entail executing various tasks consistent with the interface definitions and logic implemented within the application processing the HTTP requests.

Such processing generates the result data forming the basis for the response, which is received by client system 110A. The data in the HTTP responses may then be displayed (in a web browser) or processed by the applications/web service executing in the requesting client system.

Each of applications servers 160A-160D represents a server system, which executes enterprise applications capable of performing tasks indicated by client requests received from client systems 110A-110C. In general enterprise applications perform the tasks necessary for processing the HTTP requests and then send the result of performance of the tasks as corresponding HTTP responses to the requesting client system.

As is well known, the tasks to be performed depend on the various interface requirements with which the enterprise application are designed. For example, some HTTP requests may require construction and sending of a webpage as a response, some HTTP requests may require retrieving/storing data from data store 180, and some other HTTP requests may require invoking an operation provided by a web service, etc. The HTTP request may also contain data required for the performance of the tasks.

Each of application servers 160A-160D may also contain other software programs such as operating system, device drivers, etc., (not shown) that provides a (common) run time environment facilitating the execution of the enterprise applications.

It may be appreciated that each of application servers 160A-160D may execute multiple independent enterprise applications or independent components that may be used by more than one enterprise application. Alternatively, various tiers (or components) of a single enterprise application may be executing on the various systems in the enterprise (shown as the dotted boundary) such as application servers 160A-160D and data store 180. Further, multiple instances of the same enterprise application may be executing on more than one application server.

Front end server 150 represents a server system such as a web server, which acts as a single point of access for the enterprise when receiving and processing HTTP requests. Front end server 150 may be implemented as a proxy server, for example, by configuring intranet 140 to forward all HTTP requests received from client systems 110A-110C to front end server 150. Accordingly front end server 150 may be viewed as being present between client systems 110A-110C and the server systems 160A-160D as shown in FIG. 1B.

Figure 1B:
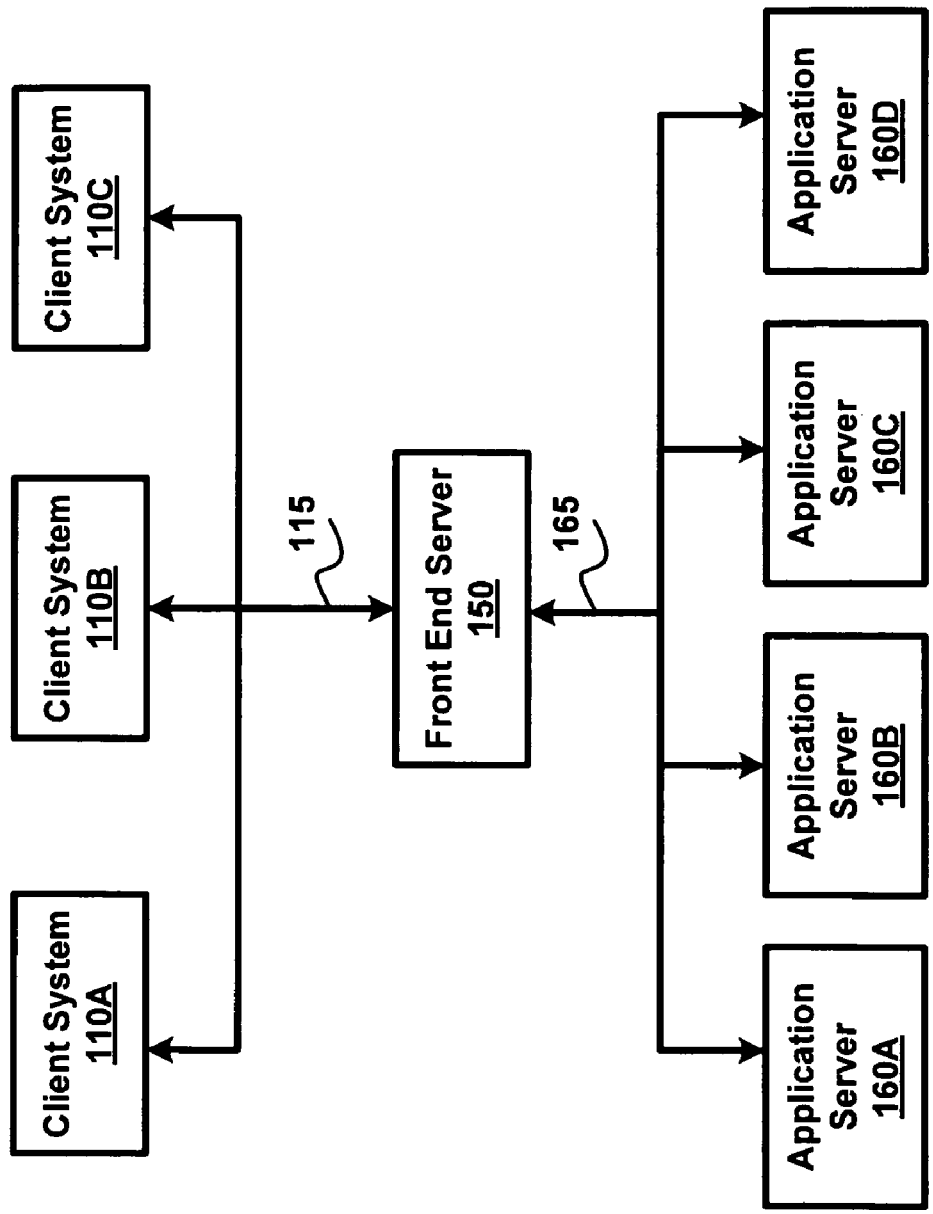
FIG. 1B is a logical view illustrating the operation of various individual systems of a computing system in an embodiment.

FIG. 1B is a logical view of an example environment/computing system (shown in FIG. 1A) in which several aspects of the present invention can be implemented. Similar numbers are used to represent corresponding blocks of FIGS. 1A and 1B and hence descriptions of such blocks are not repeated for conciseness.

Path 115 represents a logical path in Internet 120, while path 165 represents a logical path in intranet 140. The logical paths 115 and 165 may be implemented as physical paths containing one or more network stations, routers, local/wide area networks (LAN/WAN) providing functionalities such as firewall, security, etc, as will be apparent to one skilled in the relevant arts.

Front end server 150 receives HTTP requests from client systems 110A-110C via path 115 and forwards the received HTTP requests to one of the application servers 160A-160D via path 165. Front end server 150 may identify the specific application server (to forward an HTTP request) based on the location information/type of client system sending the HTTP request, type (one-way/two-way) of the received request, data contained in the HTTP request (e.g., port number or specific parameter values) indicating the specific application/application server, number of requests already assigned to each server (for load balancing), availability of a server, etc. Front end server 150 may also determine the application server based on configuration data and the data (such as URL) received as a part of the HTTP request.

Front end server 150 then receives response data corresponding to the forwarded HTTP requests from application servers 160A-160D via path 165 and forwards the HTTP responses to the requesting client systems. Front end server 150 may identify the requesting client system based on information such as the IP address of the client system, contained in the received HTTP request.

While the above description is provided with respect to sending a response corresponding to each HTTP request, in some scenarios, for example, when sending HTTP requests for invoking an operation provided by a web service, it may not be necessary that a corresponding HTTP response be received by the client system. Such HTTP requests are commonly referred to as one-way requests, while requests requiring responses being referred to as two-way requests. Thus, processing one way requests merely requires performing tasks internal in various systems provided within the enterprise application environment, while processing two way requests requires sending a response in addition.

It may be required that both one-way and two-way requests be processed reliably, in that the required tasks are executed to completion by the application servers. In the case of two way requests, the response also needs to be sent reliably.

In one prior approach referred to as HTTPR, reliable delivery of HTTP requests and responses is ensured between the front-end server and client systems. However, the protocol may not address reliability in processing of the requests. According to the various aspects of the present invention, front end server operates to ensure reliable processing of HTTP requests and is described below with examples.

3. Processing of HTTP Requests

FIG. 2 is a flowchart illustrating the manner in which HTTP requests are processed according to an aspect of the present invention. The flowchart is described with respect to FIGS. 1A and 1B merely for illustration. However, various features can be implemented in other environments also without departing from the scope and spirit of various aspects of the present invention, as will be apparent to one skilled in the relevant arts by reading the disclosure provided herein.

In addition, some of the steps may be performed in a different sequence than that depicted below, as suited in the specific environment, as will be apparent to one skilled in the relevant arts. Many of such implementations are contemplated to be covered by several aspects of the present invention. The flow chart begins in step 201, in which control immediately passes to step 210.

In step 210 front end server 150 receives HTTP requests from client systems 110A-110C. The HTTP requests may be contained in an IP packet designed to deliver the packet to front end server 150. The IP packet contains the URL identifying the application and/or application server, in addition to (optional) parameter data, which is used to determine the tasks to be performed to generate a response.

In step 230 front end server 150 submits each of the received requests to one of multiple server systems (160A-160D) for processing (to generate corresponding responses). Submission of a received request (by front end server 150) entails sending the received request to one of the servers 160A-160D, while ensuring that the corresponding server is available to process the request. This implies that the status of the server is ascertained to ensure that the server is operational to process the request.

To determine the specific one of the application servers to which the request is to be submitted, front end server 150 may maintain data indicating what types of requests are to be forwarded to which application server. One of the commonly maintained data is URL mapping, based on the requested URL, front end server forwards the requests to the corresponding server. Additionally the data maintained may also be the availability (including that the server is operational) of the servers 160A-160D, application executing in each of the servers, load on each server, etc.

In step 250 front end server 150 detects that an application server to which a HTTP request was submitted has failed during processing of the HTTP request. Failure implies that the application server is not operational to process requests, including those previously submitted and not yet completely processed.

In general, front end server 150 detects failures during processing of the requests by checking for some conditions in or association with the operation of the server systems. According to one approach, a server is deemed to have failed if no responses (even for other requests) are received from the server for a pre-specified duration. As an alternative or in addition, the status of the server may be explicitly checked regularly/periodically to confirm that the server is operational.

In step 270 front end servers 150 resubmits the HTTP request to another application server (different from the application server to which the HTTP request was submitted in step 230). Thus, the request of step 230 is resubmitted to one of the servers other than the one to which the same request was submitted (without the client systems having to resubmit the request).

Resubmission is performed similar to submission in step 230, where the servers that can process a specific request is chosen by the front end server after analyzing the request and the data maintained in the front end server. To facilitate such resubmission, front end server 150 maintains information regarding the received requests at least till such a time a corresponding response is sent back for the request. The information related to completed requests may be purged periodically.

In a scenario when the first server system 160B fails after the submission of a request to the server, the front end server resubmits the request with the same information to a different server 160C (other than 160B) thus ensuring reliable processing of http requests without the need for client systems 110A-110C to resubmit the requests as in the prior approach. The flow chart ends in step 299.

Thus, the steps of detection and resubmission (when required) of a request can be performed multiple times by front end server 150 till a response is provided for a received http request (without requiring resubmission by the client). As a result, the requests are processed reliably irrespective of failure of some of the application servers during processing of the requests.

The features thus described can be implemented in various embodiments. An example embodiment implementing the features is described in detail below.

4. Front End Server

Figure 3:
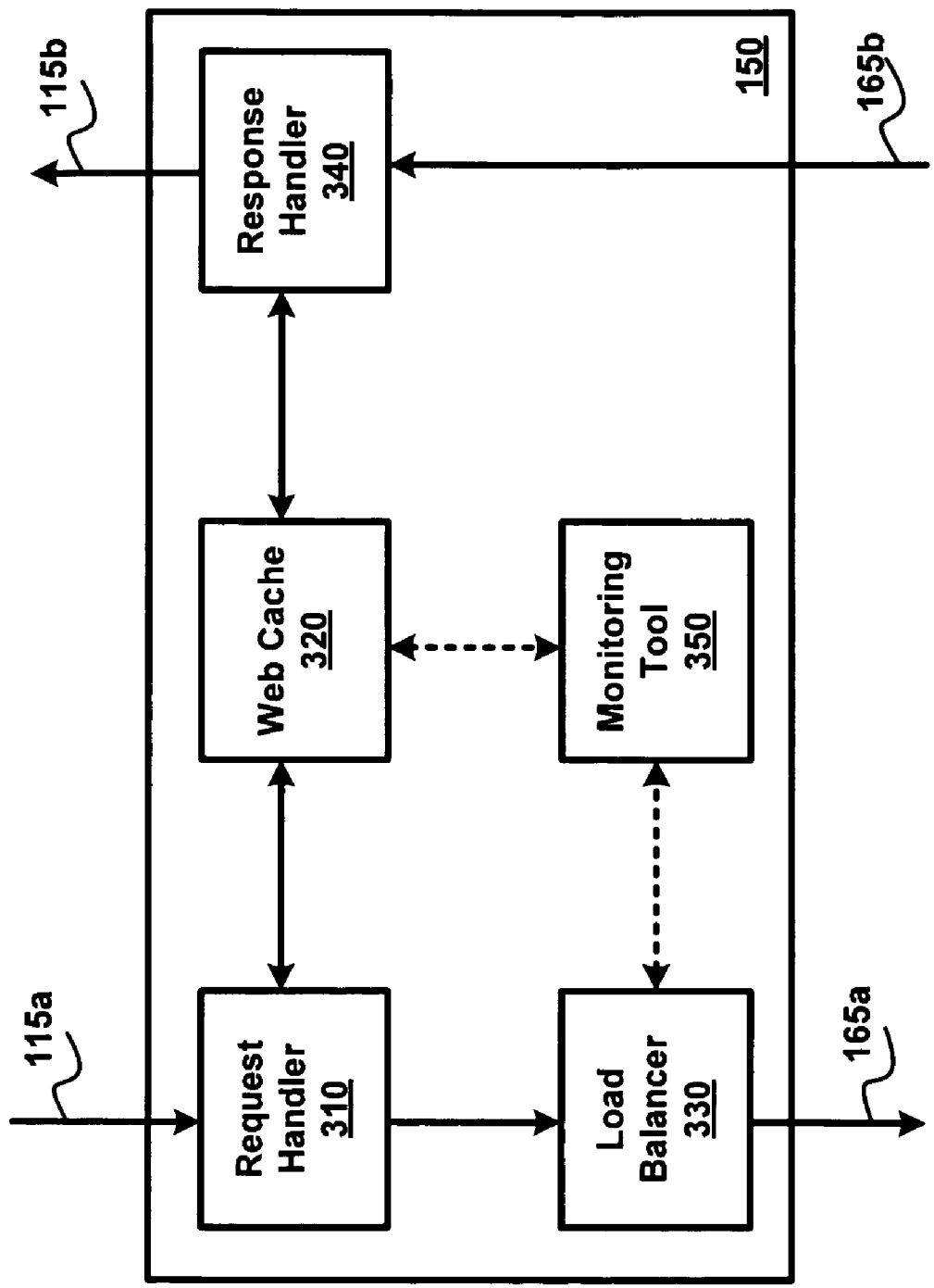
FIG. 3 is a block diagram illustrating the details of a front end server in an embodiment of the present invention.

FIG. 3 depicts portions of a front end server used for ensuring reliable processing of HTTP requests in one embodiment. For conciseness, only the blocks relevant to understanding the present invention are included in FIG. 3, though other blocks may be contained within the front end server. Each block is implemented as a hardware block supported by appropriate software/firmware instructions.

Thus, front end server 150 is shown containing request handler 310, web cache 320, load balancer 330, response handler 340, and monitoring tool 350. Further, bidirectional paths 115 and 165 (in FIG. 1B) are shown being logically split into two unidirectional paths suffixed with a, b for ease of representation. Each of the blocks is described in detail below.

Web cache 320 represents a memory (supported by appropriate hardware) which stores all the information required for (re)submitting a pending request (i.e., the requests, the processing of which is not yet complete) and thereafter to send a response containing the data generated by processing the request. Thus, the stored information includes the specific data that is to be forwarded to the application servers for processing the requests, the IP address of the client system and the identifiers of the requests and the sessions enabling to send the results of processing of the requests to the corresponding client system.

Request handler 310 receives HTTP requests from client systems 110A-110C via path 115a and performs preliminary checks prior to forwarding the request to load balancer 330 for further processing. The preliminary checks may include, for example, confirming that the request contains required data/information for the corresponding packet. If the required information is not received along with the request then the request is deemed as improper request. For improper requests, request handler 310 may send a response indicating that the received request is improper or ignore such requests.

Assuming the received request contains sufficient information, request handler populates web cache to store the HTTP request, the IP address of the source client system to which the response needs to be sent, and any other information required to process the request and provide any needed response. As is well known in the relevant arts, the received HTTP request can specify the request type (e.g., POST, GET, etc.), cookie information (which may be translated internally into a unique session identifier) to identify the session, the language used by the browser, browser type, password/user id information, etc., as suitable for the specific environment/enterprise application.

Request handler 310 creates a unique identifier for each session and a unique identifier (e.g., use the URL itself as the identifier) for each request within a session. Thus, the combination serves as a unique identifier for the request. The HTTP request is stored in web cache 320 associated with the unique identifier (such that the result of processing the request is correlated with the request, and included in the response to the client system) and then sent to load balancer 330.

Load balancer 330 receives a request to submit a HTTP request and submits the request to one of the application servers 160A-160D. Load balancer 330 may distribute the requests among the application servers 160A-160D based on, for example, various criteria noted above. Typically a load balancer distributes the received requests among servers so that no individual server is overburdened. Accordingly a load balancer is used to spread work between two or more servers, computers, network links or other resources, in order to utilize the resources better, maximize throughput and minimize response time for the received requests.

Additionally load balancer 330 maintains data required for distribution of the request. The data maintained may include name of the server, type of server, application(s) executing in the server (which determines the specific set of servers which are eligible to process specific type of requests), load/number of requests already submitted to the server, type of application executing in the application server (such as Net application, JAVA application etc.), CPU (central processing unit) processing capacity/capabilities, availability of the server, etc., as necessary for the load balancer to distribute the load/requests.

Further load balancer receives information when failure occurs in a specific server (such as 160B) and load balancer will not submit any requests to the failed server (160B) until such a time that the server 160B is operational and is ready to receive requests. Furthermore a load balancer can employ detection mechanism such as hooks (hardware or software feature well known in relevant arts) to detect that an application server is not available and update the data maintained by the load balancer and use the updated data to submit the requests to the application servers.

In addition, load balancer stores information indicating which specific requests have been submitted to which specific server. This information is used for resubmitting requests, as described below in further detail.

Response handler 340 receives the responses (via path 165b) of the processed requests from each of the servers (160A, 160B, 160C and 160D), and forwards the responses to the corresponding client system 110A-110D (from which the requests were received) via path 115b. Each response received is associated with a unique identifier identifying the request, which is used to match with the corresponding request based on the information in web cache 320. The response is sent to the corresponding client system.

Monitoring tool 350 provided according to several aspects of the present invention is used for reliable processing of HTTP requests at least to overcome some of the drawbacks described above. Though shown separately, monitoring tool 350 may be part of load balancer 330 or web cache 320 or any other block internal to front end server 150 according to the implementation details of the corresponding environment. In another embodiment, monitoring tool 350 may be external to front end server 150.

The manner in which the monitoring tool 350 ensures reliable processing of HTTP requests is described below with examples.

5. Data for Reliable Processing of Http Requests

Monitoring tool 350 uses a set of data for processing HTTP requests reliably in one embodiment. Monitoring tool 350 may form the required data combining the data in web cache, data in the load balancer and additional data from blocks internal or external (for example from one of the servers 160A-160D or response handler 340) to the front end server 150. Monitoring tool may use methods such as API (application interface) calls, RMI (remote method invocation) calls, sharing XML (extensible markup language) files, hooks (hook/callout), etc., to collect the required data. In one embodiment monitoring tool 350 may store such data. In another embodiment monitoring tool may store such data in data store 180 or in an external storage (not shown) and later retrieve when required.

FIGS. 4A and 4B depicts tables illustrating a set of data used for reliable processing of HTTP requests in one embodiment. Tables in FIGS. 4A and 4B depict the snap shots of data that is maintained by the monitoring tool 350 at different instants (each table depicting different points of time) while serving the same set of requests in one embodiment. Table 4B is a snap shot depicted which is at a later point of time than the one shown in table 4A while serving the same set of requests.

Broadly columns 421-424 depicts the data values corresponding to columns session ID (session id created by request handler 310 when the session that is sending the request was created), request identifier (created for each of the requests identifying the request), server id (id of the server 160A-160D to which the request was submitted by load balancer 330), and processed (can contain the values "Yes" indicating that the request has been processed and the response sent back to the client system that sent the request and "No" indicating that the request has not completed processing).

For example row 451 in FIG. 4A shows that request R1 (column 422) having a session id of 101 (column 421) is submitted to the server S1 (column 423) and processing of the request R1 has not been (column 424 showing "No" in FIG. 4A) completed yet. It may be noted that at a later point of time the request has completed processing and it is depicted in row 451 and column 424 of FIG. 4B showing "Yes".

During operation, requests R1, R2, R3, R4 and R5 (depicted by rows 451-455 in FIG. 4A) are received by the request handler 310 via path 115a from the client systems 110A-110D. Request handler 310 creates session id's 101, 102, 103, 104 and 105 (if not already created) for the received requests respectively. For example session id 101 corresponds to the request R1 (row 451, column 421). Similarly, request handler assigns the session id's 102, 103, 104 and 105 for the requests R2, R3, R4 and R5 (as shown in rows 452-455 and corresponding columns 421-422) respectively. It may be noted that if the session id is already created for the session that is sending the request the same may be received with the request in an embodiment.

Load balancer 330 submits the received requests to one of the available servers 160A-160D and thus may be termed as a submitter block. The server may be selected based on the information about the servers and the type/requirement/format/rules of the received request. For example, load balancer 330 may assign request R1 (with the session id 101) to server S1 based on the requested URL as shown in row 451. Further as shown in row 452, request R2 (with the session id 102) is submitted to server S2 based on the application executing in the server S2 and the request R2 may correspond to the specific application as determined by the load balancer 330. Furthermore the requests may be submitted to the servers based on the type of application the server is executing (for example .Net application, JAVA application etc.). Accordingly the requests R3, R4 and R5 in rows 453, 454 and 455 may be assigned to the servers S4, S3 and S2 respectively by the load balancer 330 after making sure that the load is being balanced among the available servers and the requests are served appropriately.

It may be noted that the column 424 for all the received requests shows "No" in FIG. 4A. In the interval between submission of a specific request to a server (such as 160A) till a corresponding response is sent back by the response handler 340 (via path 115b) the column is depicted with "No" (as shown in the column 424 for all the requests in rows 451-455 in FIG. 4A) meaning that the request has been submitted but not yet processed completely. Once the response generated by the server is sent to the front end server (for forwarding to client system which sent the request) the corresponding row value for the column 451 is changed to "Yes" by the monitoring tool 350 as shown in row 451, column 424 in FIG. 4B.

To illustrate the resubmission according to an aspect of the present invention, it is assumed that servers S2 and S3 are executing the same application and both are operational. Accordingly when the request R2 (row 452 in FIG. 4A) is received from one of the client systems, the load balancer 330 may submit the request to server S2 after verifying the loads on the servers S2 and S3.

It is now assumed that server S2 fails (brought down or stops executing the instructions that would process requests) after the submission of request R2. The failure may be detected either based on monitoring of the server S2 (e.g., by load balancer) or by absence of any responses from server S2 (e.g., by monitoring tool 350). In case load balancer 330 detects the failure of server S2, the corresponding status is notified to monitoring tool 350, which then examines the data in the tables of FIG. 4A to identify the list of requests (R2 and R5) that need to be resubmitted. It is further assumed that the detecting block immediately updates the status information indicating that server S2 is no longer available to process any requests.

To request resubmission, monitoring tool 350 retrieves the request data (from web cache 320) for each of the requests to be resubmitted, and provides the retrieved data to load balancer 330. Load balancer 330 then submits (resubmits) the request to one of the eligible and available serves. Accordingly, the requests R2 and R5 are shown as being submitted to server S3 in lines 452 and 455 of FIG. 4B. Once the processing of these requests is completed, the information in the Column 424 of FIG. 4B is later updated to Yes status. The change of status may be effected in response to receiving an indication of completion of processing the request in case of one way requests and in response to receiving the actual result data in case of two way requests.

From the above, it may be appreciated that monitoring tool 350 ensures that all the requests received are processed successfully without having the client resubmit the request when a failure in a server occurs after the submission of the request by the load balancer 330.

It should be further appreciated that the features described above can be implemented in various embodiments as a desired combination of one or more of hardware, software, and firmware. The description is continued with respect to an embodiment in which various features are operative when the software instructions described above are executed.

6. Digital Processing System

Figure 5:
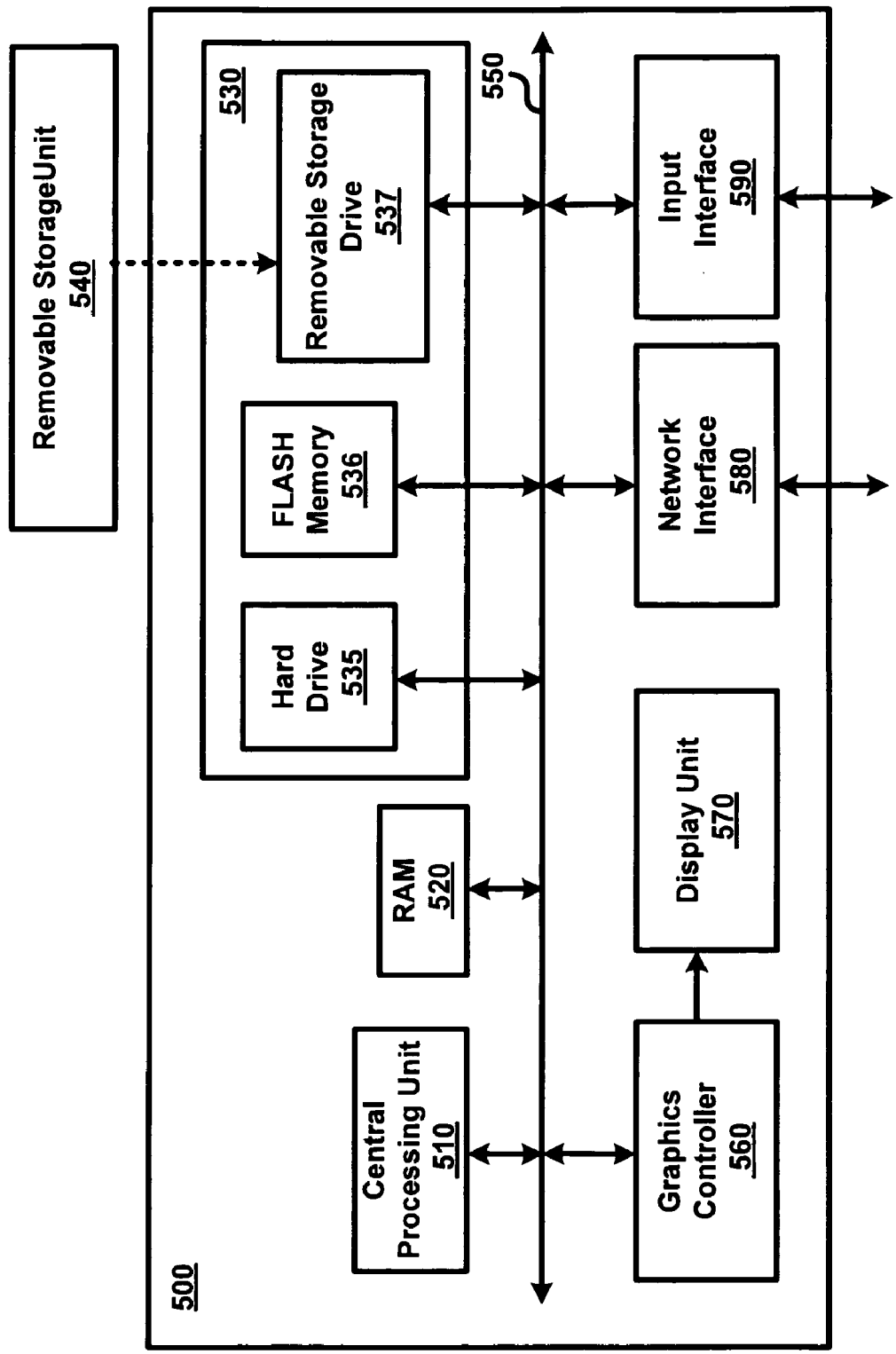
FIG. 5 is a block diagram illustrating the details of an embodiment of front end server, in which several aspects of the present invention are operative upon execution of appropriate software instructions.

FIG. 5 is a block diagram illustrating the details of digital processing system 500 in which various aspects of the present invention are operative by execution of appropriate software instructions. Digital processing system 500 corresponds to front end server 150. Digital processing system 500 may contain one or more processors (such as a central processing unit (CPU) 510), random access memory (RAM) 520, secondary memory 530, graphics controller 560, display unit 570, network interface 580, and input interface 590. All the components except display unit 570 may communicate with each other over communication path 550, which may contain several buses as is well known in the relevant arts. The components of FIG. 5 are described below in further detail.

CPU 510 may execute instructions stored in RAM 520 to provide several features of the present invention. CPU 510 may contain multiple processing units, with each processing unit potentially being designed for a specific task. Alternatively, CPU 510 may contain only a single general-purpose processing unit. RAM 520 may receive instructions from secondary memory 530 using communication path 550. RAM 520 may further store various data (e.g., the information of web cache 320 and the tables of FIGS. 4A and 4B).

Graphics controller 560 generates display signals (e.g., in RGB format) to display unit 570 based on data/instructions received from CPU 510. Display unit 570 contains a display screen to display the images defined by the display signals. Input interface 590 may correspond to a keyboard and a pointing device (e.g., touch-pad, mouse). Network interface 580 provides connectivity to a network (e.g., using Internet Protocol), and may be used to communicate with other connected systems (such as client systems 110A-110C and server systems 160A-160D) of FIG. 1A.

Secondary memory 530 may contain hard drive 535, flash memory 536, and removable storage drive 537. Secondary memory 530 may store the data and software instructions, which enable digital processing system 500 to provide several features in accordance with the present invention.

Some or all of the data and instructions may be provided on removable storage unit 540, and the data and instructions may be read and provided by removable storage drive 537 to CPU 510. Floppy drive, magnetic tape drive, CD-ROM drive, DVD Drive, Flash memory, removable memory chip (PCMCIA Card, EPROM) are examples of such removable storage drive 537.

Removable storage unit 540 may be implemented using medium and storage format compatible with removable storage drive 537 such that removable storage drive 537 can read the data and instructions. Thus, removable storage unit 540 includes a computer readable storage medium having stored therein computer software and/or data. However, the computer (or machine, in general) readable storage medium can be in other forms (e.g., non-removable, random access, etc.).

In this document, the term "computer program product" is used to generally refer to removable storage unit 540 or hard disk installed in hard drive 535. These computer program products are means for providing software to digital processing system 500. CPU 510 may retrieve the software instructions, and execute the instructions to provide various features of the present invention described above.

It should be understood that numerous specific details, relationships, and methods are set forth to provide a full understanding of the invention. For example, many of the functions units described in this specification have been labeled as modules/blocks in order to more particularly emphasize their implementation independence.

Reference throughout this specification to "one embodiment", "an embodiment", or similar language means that a particular feature, structure, or characteristic described in connection with the embodiment is included in at least one embodiment of the present invention. Thus, appearances of the phrases "in one embodiment", "in an embodiment" and similar language throughout this specification may, but do not necessarily, all refer to the same embodiment.

Furthermore, the described features, structures, or characteristics of the invention may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the invention.

7. CONCLUSION

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

It should be understood that the figures and/or screen shots illustrated in the attachments highlighting the functionality and advantages of the present invention are presented for example purposes only. The present invention is sufficiently flexible and configurable, such that it may be utilized in ways other than that shown in the accompanying figures.

Further, the purpose of the following Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A computing system comprising:
   a set of server systems to process hypertext transfer protocol (HTTP) requests;
   a client system to send a HTTP request; and
      a front end server to receive said HTTP request and to submit said HTTP request to a first server system,
      said first server system to generate a response processing said HTTP request and to send said response to said client system to complete processing of said HTTP request, said first server system sending no response to said client system upon failure to complete processing said HTTP request,
      said front end server to maintain an information indicating that said request has been submitted to said first server system and a status field set to a first value to indicate that processing of said HTTP request is not yet complete, said information and said status field with said first value being maintained on submission of said HTTP request to said first server system,
      wherein said status field is designed to be set to a second value to indicate that processing of said HTTP request is complete on completion of processing of said HTTP request,
      said front end server comprising a monitoring tool to check whether said first server system has failed after submission of said HTTP request,
      upon finding that said first server system has failed, said monitor tool to identify that said first request is to be resubmitted to another server system based on said information indicating that said request has been earlier submitted to said first server system if said status field is still set to said first value,
      upon identifying that said first request is to be resubmitted, said front end server to resubmit said first request to a second server system,
      said second server system to generate said response by completing processing of said request and to send said response to said client system, wherein said status field is set to said second value upon completion of processing of said request and sending of said response to said client system,
      whereby said client system receives said response without having to resubmit said HTTP request even in case of failure of said first server system in processing said HTTP request, wherein said first server system and said second server system are contained in said set of server systems.

2. The computing system of claim 1, wherein said front end server stores a portion of said HTTP request, said stored portion including a universal resource locator or indicator (URL/URI) received in said HTTP request, wherein said front end system resubmits said HTTP request to said second server system by sending said URL/URI of said stored portion.

3. The computing system of claim 1, wherein said front end server maintains a table with a first column corresponding to said information and a second column corresponding to said status, said table also containing a plurality of rows, with each row corresponding to one of a submitted responses such that a first row corresponds to said request,
   on submission of said request to said first server system, said first row storing said information indicating that said request is submitted to said first server system corresponding to said first column and said status field set to said first value,
   wherein said monitoring tool inspects said first row in identifying that said HTTP request is to be resubmitted, said monitoring tool to resubmit said HTTP request to said second server system, on submission of said request to said second server system, said monitoring tool to set said first row to indicate that said HTTP request has been submitted to said second server system, on completion of processing of said HTTP request by said second server system, said second column of said second row being set to said second value to indicate that processing of said HTTP request is complete.

4. The computing system of claim 3, wherein said front end server checks periodically whether each of said set of server systems is operational or not,
   wherein said monitoring tool is designed to inspect said status information if said first server system is determined not to be operational and to resubmit said HTTP request to said second server system if said status information also indicates that said HTTP request has been submitted to said first server system and processing of said HTTP request is not yet complete.

5. The computing system of claim 3, wherein said HTTP request is a one way request not requiring a response to be sent to said client system,
   wherein said set of server systems are designed to indicate completion of processing of requests,
   said front end server updating said status of said first row to indicate completed status upon receiving indication of completion from said second server system.

6. The computing system of claim 3, wherein said HTTP request is a two way request requiring a response to be sent to said client system,
   said second server system generating a response data by completing processing of said HTTP request, said front end server to receive said response data and to generate said response to said HTTP request and to update said status of said first row to indicate completion of processing of said HTTP request.

7. The computing system of claim 4, wherein each of said server systems is an application server, each of said set of server systems implementing a corresponding set of enterprise applications,
wherein said front end server inspects said HTTP request to determine an enterprise application designed to process said HTTP request,
said front end server to further select one of said server systems executing said enterprise application to submit said HTTP request.

8. A front end server comprising:
a request handler to receive a hypertext transfer protocol (HTTP) request from a client system; and
a submitter block to submit said HTTP request to a first server system and to maintain an information indicating that said request has been submitted to said first server system and a status field set to a first value to indicate that processing of said HTTP request is not yet complete, said information and said status field with said first value being maintained on submission of said HTTP request to said first server system,
wherein said status field is designed to be set to a second value to indicate that processing of said HTTP request is complete on completion of processing of said HTTP request;
a monitoring tool to determine whether said first server system has failed after submission of said HTTP request,
said monitoring tool, upon determining that said first server system has failed, to identify that said first request is to be resubmitted to another server system based on said information indicating that said request has been earlier submitted to said first server system if said status field is still set to said first value,
said monitoring tool to cause said submitter block and then to resubmit said HTTP request to a second server system upon said identifying that said first request is to be resubmitted to another server system,
wherein said first server system is designed to generate a response by processing said HTTP request and to send said response to said client system to complete processing of said HTTP request, said first server system sending no response to said client system upon failure to complete processing of said HTTP request,
wherein said first server system is detected to have failed based on absence of any response from said first server system to said client system,
wherein said server system is designed to generate said response by completing processing of said request and to send said response to said client system,
wherein said status field is set to said second value upon completion of processing of said request and sending of said response to said client system, and
wherein said front end server comprises a processor designed to execute a set of instructions to implement at least one of said request handler, said submitter block and said monitoring tool.

9. The front end server of claim 8, wherein said front end server further comprises a memory,
said request handler to store a portion of said HTTP request in said memory, said portion including a universal resource locator or indicator (URL/URI) received in said HTTP request, wherein said submitter block resubmits said HTTP request to said second server system by sending said URL/URI of said stored portion.

10. The front end server of claim 9, wherein said request handler first examines said HTTP request to determine whether required information is present in said HTTP request,
said request handler to further stores said portion in said memory and forward said HTTP request to said submitter block only if said HTTP request contains the required information.

11. The front end server of claim 9, wherein memory stores a status information indicating whether processing of said HTTP request is completed or not, said monitoring tool to inspect said status information prior to resubmitting said HTTP request, wherein said HTTP request is resubmitted only if said status information indicates that the processing of said HTTP request is not completed.

12. The front end server of claim 11, wherein said submitter block checks periodically whether each of said set of server systems is operational or not,
wherein said monitoring tool is designed to inspect said status information if said first server system is determined not to be operational and to interface with said submitter block to resubmit said HTTP request to said second server system if said status information also indicates that said HTTP request has been submitted to said first server system and processing of said HTTP request is not yet complete.

13. The front end server of claim 12, wherein said HTTP request is a one way request not requiring a response to be sent to said client system,
wherein each of said first server system and said second server system is designed to indicate completion of processing of requests,
said monitoring tool to update said status information to indicate completed status upon receiving indication of completion of processing of said HTTP request from said second server system.

14. The front end server of claim 12, wherein said HTTP request is a two way request requiring a response to be sent to said client system,
said second server system generating a response data by completing processing of said HTTP request,
said front end server further comprising a response handler to receive said response data and to generate and send a response to said HTTP request.

15. The front end server of claim 12, wherein each of said first server system and said second server system is an application server implementing a corresponding set of enterprise applications,
wherein said submitter block inspects said HTTP request to determine an enterprise application designed to process said HTTP request,
said submitter block to further select one of said server systems executing said enterprise application to submit said HTTP request.

16. A method of ensuring reliable processing of HTTP requests, said method comprising:
receiving a hypertext transfer protocol (HTTP) request from a client system;
submitting said HTTP request to a first server system, said first server system designed to generate a response processing said HTTP request and to send said response to said client system to complete processing of said HTTP request, said first server system sending no response to said client system upon failure to complete processing said HTTP request;

storing a status information indicating whether processing of said HTTP request is completed or not, wherein said status information is set to a first value to indicate that processing of said HTTP request is not yet complete, said information and said status field with said first value being maintained on submission of said HTTP request to said first server system, wherein said status field is designed to be set to a second value to indicate that processing of said HTTP request is complete on completion of processing of said HTTP request;

updating said status information by setting to said second value to indicate that processing of said HTTP request is complete if a response data is received for said HTTP request;

detecting that said first server system has failed without completing processing of said HTTP request based on absence of any response from said first server system to said client system; and resubmitting said HTTP request to a second server system upon said detecting, wherein said resubmitting of said HTTP request is performed only if said status information indicates that processing of said HTTP request is not completed by being at said second value.

17. The method of claim 16, further comprising:

storing a universal resource locator or indicator (URL/URI) received in said HTTP request in a memory, wherein said resubmitting comprises retrieving said URL/URI from said memory and forwarding said URL/URI to said second server system.

18. The method of claim 17, wherein said detecting comprises checking whether said first server system has not indicated completion of any requests in a pre-specified duration.

19. The method of claim 17, wherein said detecting comprises checking whether said first server system is operational or not, wherein said resubmitting of said HTTP request is performed if said first server system is found not to be operational and processing of said HTTP request submitted to said first server system is not yet complete.

20. A non-transitory machine readable medium storing one or more sequences of instructions for causing a front-end server to process hypertext transfer protocol (HTTP) requests, wherein execution of said one or more sequences of instructions by one or more processors contained in said system causes said front-end server to perform the actions of:

receiving a HTTP request from a client system;

submitting said HTTP request to a first server system, said first server system designed to generate a response processing said HTTP request and to send said response to said client system to complete processing of said HTTP request, said first server system sending no response to said client system upon failure to complete processing said HTTP request;

storing a status information indicating whether processing of said HTTP request is completed or not, wherein said status information is set to a first value to indicate that processing of said HTTP request is not yet complete, said information and said status field with said first value being maintained on submission of said HTTP request to said first server system, wherein said status field is designed to be set to a second value to indicate that processing of said HTTP request is complete on completion of processing of said HTTP request;

updating said status information by setting to said second value to indicate that processing of said HTTP request is complete if a response data is received for said HTTP request;

detecting that said first server system has failed without completing processing of said HTTP request based on absence of any response from said first server system to said client system; and resubmitting said HTTP request to a second server system upon said detecting, wherein said resubmitting of said HTTP request is performed only if said status information indicates that processing of said HTTP request is not completed by being at said second value.

21. The machine readable medium of claim 20, further comprising: storing a universal resource locator or indicator (URL/URI) received in said HTTP request in a memory, wherein said resubmitting comprises retrieving said URL/URI from said memory and forwarding said URL/URI to said second server system.

22. The machine readable medium of claim 21, wherein said detecting comprises checking whether said first server system has not indicated completion of any requests in a pre-specified duration.

23. The machine readable medium of claim 22, wherein said detecting comprises checking whether said first server system is operational or not, wherein said resubmitting of said HTTP request is performed if said first server system is found not to be operational and processing of said HTTP request submitted to said first server system is not yet complete.

* * * * *